United States Patent
Ahuja et al.

(10) Patent No.: US 10,510,169 B2
(45) Date of Patent: *Dec. 17, 2019

(54) SYSTEMS AND METHODS FOR PROVIDING FUSED IMAGES TO REMOTE RECIPIENTS FOR DESCRAMBLING AND INTERPRETATION

(71) Applicant: Glu Mobile Inc., San Francisco, CA (US)

(72) Inventors: Sourabh Ahuja, San Francisco, CA (US); Lian Amaris, Oakland, CA (US); Liang Wu, San Francisco, CA (US); Tao Tao, San Mateo, CA (US)

(73) Assignee: Glu Mobile, Inc., San Francisco, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/072,144

(22) Filed: Mar. 16, 2016

(65) Prior Publication Data

US 2016/0196680 A1    Jul. 7, 2016

Related U.S. Application Data

(63) Continuation of application No. 14/268,273, filed on May 2, 2014, now Pat. No. 9,336,189.

(Continued)

(51) Int. Cl.
    *G06T 11/60*    (2006.01)
    *G06F 17/24*    (2006.01)
    (Continued)

(52) U.S. Cl.
    CPC ............. *G06T 11/60* (2013.01); *G06F 3/012* (2013.01); *G06F 3/1454* (2013.01); *G06F 3/167* (2013.01);
    (Continued)

(58) Field of Classification Search
    CPC ..... G06F 17/241; G06F 3/012; H04M 3/5307
    See application file for complete search history.

(56) References Cited

U.S. PATENT DOCUMENTS

| 4,884,972 A | 12/1989 | Gasper |
| 5,860,653 A * | 1/1999 | Jacobs ................. G06Q 10/107 |
| | | 273/272 |

(Continued)

FOREIGN PATENT DOCUMENTS

| JP | 11-175092 A | 7/1999 |
| JP | 2001-067179 A | 3/2001 |

(Continued)

OTHER PUBLICATIONS

International Search Report for International Patent Application No. PCT/US2014/065842, dated Feb. 27, 2015, 4 pages.

*Primary Examiner* — Manglesh M Patel
*Assistant Examiner* — Nicholas Hasty
(74) *Attorney, Agent, or Firm* — Brett A. Lovejoy; Morgan, Lewis & Bockius LLP

(57) ABSTRACT

Disclosed are systems and methods for using a hands free computing device. The device includes a processor, a head movement measuring component, screen, camera, microphone, and memory. Responsive to sensing an instruction by a user, an image is captured by the camera and displayed on the screen. There is recorded, using the microphone, an audible catch phrase provided by the user for the image. The audible catch phrase is converted to text that is superimposed on the image thereby making a fused image. The user identifies one or more remote recipients of the fused image. The fused image is communicated, with the text phrase formatted for scrambled display, to the one or more remote recipients. The fused image is displayed on remote devices associated with such recipients with the text phrase scrambled.

29 Claims, 7 Drawing Sheets

Related U.S. Application Data

(60) Provisional application No. 61/905,143, filed on Nov. 15, 2013, provisional application No. 61/905,829, filed on Nov. 18, 2013.

(51) Int. Cl.

| | | |
|---|---|---|
| *G06F 21/36* | (2013.01) | |
| *G06F 3/01* | (2006.01) | |
| *G06F 3/14* | (2006.01) | |
| *G06F 3/16* | (2006.01) | |
| *G10L 15/26* | (2006.01) | |
| *H04L 9/32* | (2006.01) | |
| *H04M 3/53* | (2006.01) | |
| *G06Q 30/02* | (2012.01) | |
| *G07F 17/32* | (2006.01) | |
| *G09C 5/00* | (2006.01) | |
| *G06Q 50/00* | (2012.01) | |

(52) U.S. Cl.
CPC ............ *G06F 17/241* (2013.01); *G06F 21/36* (2013.01); *G06Q 30/0209* (2013.01); *G06Q 50/01* (2013.01); *G07F 17/3206* (2013.01); *G07F 17/3209* (2013.01); *G07F 17/3227* (2013.01); *G09C 5/00* (2013.01); *G10L 15/265* (2013.01); *H04L 9/32* (2013.01); *H04M 3/5307* (2013.01); *G10L 15/26* (2013.01)

(56) References Cited

U.S. PATENT DOCUMENTS

| | | | |
|---|---|---|---|
| 8,083,523 B2* | 12/2011 | De Ley | G09B 5/00 434/159 |
| 8,577,024 B2* | 11/2013 | Ducharme | H04L 9/0643 380/28 |
| 2002/0098891 A1* | 7/2002 | Graham | A63F 13/12 463/42 |
| 2007/0164985 A1 | 7/2007 | Jeong et al. | |
| 2013/0117692 A1 | 5/2013 | Padmanabhan et al. | |
| 2013/0174205 A1 | 7/2013 | Jacobsen et al. | |
| 2014/0075335 A1 | 3/2014 | Hicks et al. | |
| 2014/0101592 A1* | 4/2014 | Costa | G06F 3/0482 715/772 |

FOREIGN PATENT DOCUMENTS

| | | |
|---|---|---|
| JP | 2003-233872 A | 8/2003 |
| JP | 2011-164955 A | 8/2011 |

\* cited by examiner

SYSTEMS AND METHODS FOR PROVIDING FUSED IMAGES TO REMOTE RECIPIENTS FOR DESCRAMBLING AND INTERPRETATION

REFERENCE TO RELATED APPLICATIONS

This application claims the benefit of U.S. Provisional Patent Application No. 61/905,143, filed Nov. 15, 2013, and titled "SYSTEMS AND METHODS FOR PROVIDING FUSED IMAGES TO REMOTE RECIPIENTS FOR DESCRAMBLING AND INTERPRETATION."

This application also claims the benefit of U.S. Provisional Patent Application No. 61/905,829, filed Nov. 18, 2013, and titled "SYSTEMS AND METHODS FOR PROVIDING FUSED IMAGES TO REMOTE RECIPIENTS FOR DESCRAMBLING AND INTERPRETATION."

This application also claims the benefit of U.S. patent application Ser. No. 14/268,273, filed May 2, 2014, and titled "SYSTEMS AND METHODS FOR PROVIDING FUSED IMAGES TO REMOTE RECIPIENTS FOR DESCRAMBLING AND INTERPRETATION."

Each of the above-identified patent applications is hereby incorporated by reference in its entirety.

TECHNICAL FIELD

The disclosed implementations relate generally to sharing fused images, generated using hands free devices, to remote participants so that they may descramble messages encoded in such images.

BACKGROUND

The advent of portable electronic devices has provided a platform for social networking applications. In the past, one could only log into social networking sites using an Internet enabled desktop computer. With the advent of smart phones and tablets, it is now possible to check E-mail, review text messages, and communicate on social networking sites any time. As a result, participation in such services has increased in recent years. Users, now more than ever, share electronic communications with each other. Such communications provide the basis for entertainment and communication. Given the popularity of such modes of communication, what is needed in the art are new types of communication. Such new types of communication are needed to provide a way to truly deliver messages that stand out from conventional messages.

Given the above background, what are needed in the art are new methods of electronic communication.

SUMMARY

The present disclosure addresses the need in the art by providing new methods of electronic communication. In the present disclosure, hands free mobile devices, equipped with a camera allow a user to take a picture of any interesting scene that the user encounters during the day. The user is then given the opportunity to orally provide a message for the image. For example, the image may be a picture of a fish tank, and the oral message may be the name of a fish in the fish tank. In the systems and methods provided in the present disclosure, the oral message is converted to a text message through voice recognition software. The text message is then associated with the image to form a fused image. In the systems and methods provided in the present disclosure the user is given the opportunity to share the fused image with one or more remote recipients. Advantageously, this is done by accessing a profile associated with the user that provides the contact information for one or more remote users associated with the user. Because of this profile, it is not necessary for the user to enter in the contact information, but rather, the user simply uses head movements, detected by the hands free device to select from among the remote users that are to receive the fused image. The fused image is formatted such that the recipient must descramble the text message. For instance, if the text message is a two word phrase, the recipient must decode one of the two words by descrambling the letters of the first word, and then the second of the two words by descrambling the letters of the second word. The two word phrase may, for instance in the example of the fish tank, may represent the names of two different fish in the tank. Or, the two word phrase may be a message (e.g., "go sharks").

In some embodiments, recipients of the fused image are wearing a hands free device. They receive the fused image and sequentially descramble the various scrambled words in the text message associated with the image in the fused image. In one advantageous embodiment, the user sees the letters of a word to be descrambled, and using the image as a hint as to what the word may be, uses head movements to move select letters of the word into a predetermined portion of a display screen displaying the image and the letters in order to build the descrambled word. If the user orders the letters correctly, the arrangement is accepted and the user is allowed to progress to the next word in the message. In some embodiments, a timer is used, and for instance, the user is allowed only a predetermined amount of time to descramble all the words in the fused image. The user earns an accolade or reward, the nature of which depends on how many of the words in the fused image the user was able to descramble. For instance, if the user descrambles all the words in the message within a predetermined amount of time, then the user earns a top tier accolade or reward, if the user descrambles most but not all the words in the message, the user earns a second tier accolade or reward and so forth. In some embodiments, the success of the user is not measured against time, but rather against right versus wrong selections. In such embodiments, the goal is to make no wrong choices when selecting letters to descramble the text message in the fused image. Thus, for clarity, the text message in a fused image can either be a list of words or phrases that are associated with the image or the text message can be a single word or multiword passage (e.g., "Will you marry me?"). In some embodiments, in addition to alphanumerical characters that are to be descrambled, there are punctuation symbols or other symbols such as a heart symbol, a happy face symbol, and so forth.

One aspect of the present disclosure provides a method for providing a fused image using a first hands free computing device. The first hands free computing device comprises one or more processors, one or more head movement measuring components, a screen, a camera, a microphone, and memory storing one or more programs for execution by the one or more processors. The method comprises, responsive to sensing an instruction by a user, capturing an image using the camera. The method further comprises displaying the image on the screen. The method further comprises recording, using the microphone, an audible catch phrase provided by the user at a time when the image is displayed on the screen. The method further comprises converting the audible catch phrase to a text phrase. The text phrase is displayed superimposed on the image on the screen thereby displaying a fused image. There is obtained an identification, from the user, of one or more remote recipients of the fused image. The obtaining makes use of one or more predetermined head movements by the user that are sensed via the one or more head movement measuring components. The fused image is wirelessly communicated to a remote destination, with the text phrase formatted for scrambled display. From the remote destination, with the text phrase scrambled, the fused image is distributed to the one or more remote recipients for display on one or more remote devices associated with the one or more remote.

In some embodiments, the method further comprises obtaining a confirmation by the user that the text phrase is correct prior to wirelessly communicating the fused image. In some embodiments, the confirmation is communicated to the first hands free computing device by one or more head movements that are sensed via the one or more head movement measuring components.

In some embodiments, the one or more head movement measuring components includes a gyroscope or an accelerometer. In some embodiments, the instruction by the user to capture the image using the camera is one of: (i) one or more predetermined oral instructions, (ii) one or more predetermined head movements, or (iii) a combination of one or more predetermined oral instructions and one or more predetermined head movements.

In some embodiments, obtaining the identification comprises comparing a characteristic of a head movement sensed by the one or more head movement components to a characteristic of a stored library of head movement commands. For instance, in some embodiments, the characteristic is one or more of (i) a speed associated with the sensed head movement, (ii) an acceleration associated with the sensed head movement, (iii) a degree of the sensed head movement, and (iv) a direction of the sensed head movement.

In some embodiments, the obtaining the identification, from the user, makes use of a profile associated with the user that comprises identification information for the one or more remote recipients. In some embodiments, the profile associated with the user includes information obtained from an email account associated the user. In some embodiments, the profile associated with the user includes information obtained from a social networking account associated the user. In some embodiments, the profile associated with the user includes information identifying one of: an age of the user, an education level of the user, a language preference of the user, a gender of the user, a physical handicap associated with the user, and a geographical location of the user. In some embodiments, the identification information for the one or more remote recipients includes an E-mail address or social networking address of each of the one or more remote recipients.

In some embodiments, the first hands free computing device is attached to the user's head. In some embodiments, the first hands free computing device is a mobile device. In some embodiments, the first hands free computing device is a computing cloud-enabled device. In some embodiments, the first hands free computing device is an Internet-enabled device. In some embodiments, the first hands free computing device is connected with the Internet using one of: a cellar network connection, a wireless connection, a Bluetooth connection, and an infrared connection.

In some embodiments, the text phrase comprises a plurality of words. In some embodiments the plurality of words communicate a single phrase (e.g., "I love you") whereas in other embodiments the plurality of words do not communicate a single phrase but rather are independently associated with the image (e.g., the names of different types of fish in an image of a fish tank).

In some embodiments, the method further comprises formatting the text phrase, in the fused image for distribution to the one or more remote recipients, for sequential scrambled display of each word in the plurality of words. In some embodiments, the method further comprises receiving instructions to format the text phrase, in the fused image for distribution to the one or more remote recipients, for sequential scrambled display of each word in the plurality of words in the same order of the corresponding words in the audible catch phrase. In some embodiments, the instructions to format the text phrase are communicated to the first hands free computing device by one or more head movements that are sensed via the one or more head movement measuring components.

In some embodiments, the method further comprises receiving instructions to format the text phrase, in the fused image for distribution to the one or more remote recipients, for sequential scrambled display of each word in the plurality of words in an order that is different than the order of the corresponding words in the audible catch phrase. In some embodiments, the instructions to format the text phrase are communicated to the first hands free computing device by one or more head movements that are sensed via the one or more head movement measuring components.

In some embodiments, a remote device in the one or remote devices is a second hands free computing device.

Another aspect of the present disclosure provides a method for reviewing a fused image using a hands free computing device. The hands free computing device comprises one or more processors, one or more head movement measuring components, a screen, and a memory storing one or more programs for execution by the one or more processors. The method comprises receiving a fused image from a remote destination. The fused image comprises a scrambled text phrase formatted for scrambled display and an associated image. The scrambled text phrase comprises a plurality of scrambled words. The associated image is displayed on the screen. A first scrambled word in the plurality of scrambled words is also displayed on the display as a first plurality of letters superimposed on all or a portion of the associated image. One or more head movements of the user are sensed via the one or more head movement measuring components within the computing device. The one or more head movements serve to identify a letter in the first plurality of letters. The method proceeds by acting upon the one or more head movements, the acting comprising (i) pulling the identified letter to a word construction zone on the display when the identified letter matches the correct letter of the first scrambled word, or (ii) forgoing pulling the identified letter to a word construction zone on the display when the identified letter does not match the correct letter of the first scrambled word. The steps of sensing head movements and acting upon them in the above-identified manner continues until the plurality of letters has been pulled into the word construction zone. In some embodiments, the method comprises executing the aforementioned displaying, sensing, acting, and repeating steps for each respective word in the plurality of words. In some embodiments, the method comprises executing the aforementioned displaying, sensing, acting, and repeating steps for each respective word in the plurality of words until the user commits a predetermined number of errors (e.g., wrong letter choices). In some embodiments, the method comprises executing the aforementioned displaying, sensing, acting, and repeating steps for each respective word in the plurality of words until a predetermined amount of time has elapsed.

In some embodiments, the one or more head movement measuring components includes a gyroscope or an accelerometer.

In some embodiments, acting upon the one or more head movements comprises comparing a characteristic of a head movement sensed by the one or more head movement components to a characteristic of a stored library of head movement commands, where the characteristic is one or more of (i) a speed associated with the sensed head movement, (ii) an acceleration associated with the sensed head movement, (iii) a degree of the sensed head movement, and (iv) a direction of the sensed head movement.

In some embodiments, the hands free computing device is attached to the user's head. In some embodiments, the hands free computing device is a mobile device, a computing cloud-enabled device and/or an Internet-enabled device. In some embodiments, the hands free computing device is connected with the Internet using one of: a cellar network connection, a wireless connection, a Bluetooth connection, and an infrared connection.

In some embodiments, the scrambled text phrase is formatted for sequential scrambled display of each word in the plurality of scrambled words. In some embodiments, the method further comprises tracking an amount of time it takes for the user to descramble the plurality of scrambled words and communicating an accolade or reward to the user when the words are descrambled within a predetermined amount of time.

In some embodiments, an identity of the accolade or reward is determined by an amount of time that it takes for the user to descramble the plurality of words.

In some embodiments, the method further comprises tracking a number of errors incurred by the user when descrambling the plurality of scrambled words and communicating an accolade or reward to the user when the words are descrambled with less than a predetermined number of errors. In some embodiments, an identity of the accolade or reward is determined by a number of errors incurred by the user in descrambling the plurality of words. In some embodiments, an error is the selection of an incorrect alphanumerical character.

In some embodiments, the plurality of words collectively encodes a single phrase for the associated image. In some embodiments, the plurality of words collectively encodes a plurality of words or phrases for the associated image.

In other aspects of the present disclosure, computing systems and non-transitory computer storage mediums for executing one or more steps of any of the above-described methods are also disclosed.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the several views of the drawings.

DETAILED DESCRIPTION

Disclosed herein are systems and methods for using a hands free computing device, which comprises a processor, one or more head movement measuring components, screen, camera, microphone, and memory. Responsive to sensing an instruction by a user, an image is captured by the camera and displayed on the screen. Next, there is recorded, using the microphone, an audible catch phrase provided by the user for the image. The audible catch phrase is converted to text, which is then superimposed on the image thereby making a fused image. The text phrase may represent a single message or it may represent multiple messages associated with the image. The user identifies one or more remote recipients of the fused image by making one or more predetermined head movements to select from among recipient candidates. The fused image is communicated, with the text phrase formatted for scrambled display, to the one or more remote recipients. The fused image is displayed on remote devices associated with such recipients with the text phrase scrambled. Recipients then descramble the text phrase to determine the scrambled message.

Additional details of implementations are now described in relation to the Figures.

Figure 1:
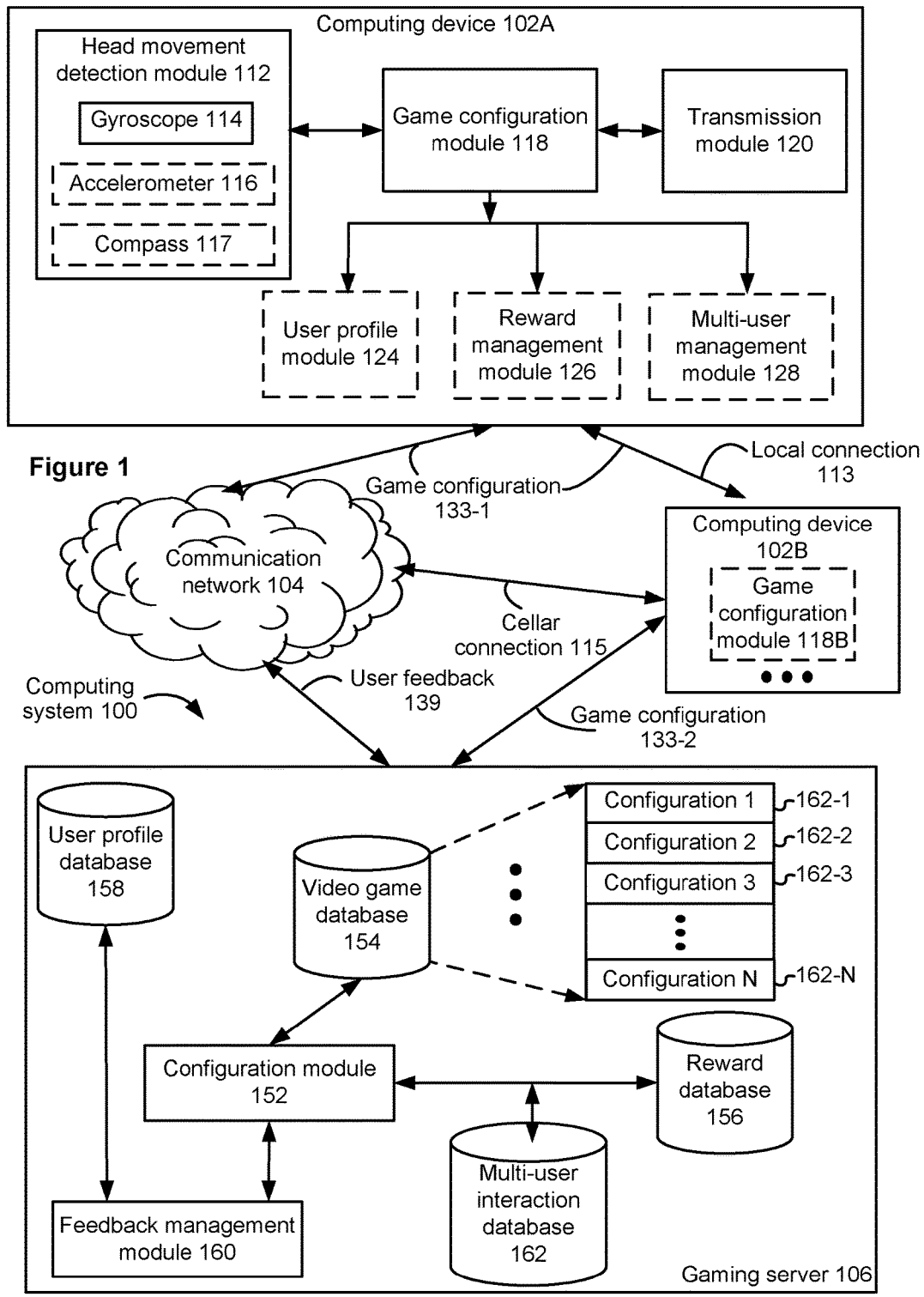
FIG. 1 is an example block diagram illustrating a computing system, in accordance with some implementations of the present disclosure.

FIG. 1 is a block diagram illustrating a computing system 100, in accordance with some implementations.

In some implementations, the computing system 100 includes one or more hands free computing devices 102 (e.g., computing devices 102A, 102B, 102C, 102D . . . , and 102N), a communication network 104, and one or more gaming server systems 106. In some implementations, a computing device 102 is a phone (mobile or landline, smart phone or otherwise), a tablet, a computer (mobile or otherwise), or a hands free computing device, such as a GOOGLE GLASS device.

In some implementations, a computing device 102 senses a user's head movement, and prepares a fused image in accordance therewith. In some implementations, the computing device 102 displays an image on the screen and records, using the microphone, an audible catch phrase provided by the user at a time when the image is displayed on the screen, and converts the audible catch phrase to a text phrase. In some implementations, a computing device 102 displays the text phrase superimposed on the image, thereby displaying a fused image. In some implementations, a computing device 102 obtains identification, from the user, of one or more remote recipients of the fused image, for example, by making use of one or more predetermined user head movements that are sensed via the one or more head movement measuring components. In some implementations, a computing device 102 wirelessly communicates the fused image to a remote destination, with the text phrase formatted for scrambled display, for distribution to the one or more remote recipients for display on one or more remote devices (e.g., a GOOGLE GLASS device or a smartphone) associated with the one or more remote recipients with the text phrase scrambled.

In some implementations, a computing device 102 includes a head movement detection module 112, which includes one or more gyroscopes 114, optionally one or more accelerometers 116, and optionally one/or more compasses 117. In some implementations, the computing device 102 also includes a game configuration module 118, a transmission module 120, a user profile module 124, a reward management module 126, and a multi-user management module 128.

In some implementations, the head movement detection module 112 senses/detects a user head movement, e.g., when the user is playing a video game, by measuring one or more characteristics of a sensed user's head movement—e.g., via the one or more accelerometers 116, a speed and/or an acceleration associated with the sensed head movement; via the one or more gyroscopes 114, a degree (e.g., 30 degree forward or 10 degree backward) and/or a direction (e.g., clockwise, counter clockwise, left/right hand side, and forward/backward) of the sensed head movement.

In some implementations, the game configuration module 118 manages gaming configuration (e.g., game configurations 133-1 and 133-2) of one or more video games, e.g., converting an audible catch phrase to a text phrase (e.g., using speech recognition techniques), displaying the text phrase superimposed on the image on the screen thereby displaying a fused image (e.g., using image processing techniques), and obtaining an identification (e.g., a verbal identification or a gesture, such as figure, eye, or head movement, identification), from the user, of one or more remote recipients (e.g., other users of a hands free computing device) of the fused image. In some implementations, the obtaining makes use of one or more predetermined head movements by the user that are sensed via the one or more head movement measuring components. For example, using head movement (or an optional touch pad associated with device 102 or a microphone associated with device 102), a user can cause a contact list to be displayed on a display device associated with the hands free computing device 102, go through the contact list, and choose one or more recipients from the contact list. In some implementations, a user also uses eye movement, hand movement or voice commands to select remote recipients. For example, in some embodiments, a contact list is displayed on a display device associated with (e.g., communicatively connected with) hands free computing device 102, a user's hand gesture is captured by a camera associated with (e.g., installed within, attached to, or otherwise connected with) a hands free computing device, and the captured hand-gesture is used to determine which remote recipient on the contact list will receive a fused image.

In some implementations, the transmission module 120 wirelessly communicates the fused image to a remote destination, with the text phrase formatted for scrambled display, for distribution to the one or more remote recipients for display on one or more remote devices associated with the one or more remote recipients with the text phrase scrambled. For example, once recipients are determined, a hands free computing device 102-A transmits, via either a location connection 113 (e.g., a WIFI connect at a user's residence) or the communication network 104 (e.g., a cellular connection 115), to another hands free computing device 102B. In some cases, a connection, through which a fused image is delivered from one hands free computing device to another hands free computing device, is determined automatically—without user/human intervention. For example, if a recipient device is reachable by a local connection (e.g., when a user and the user's siblings are both at their home), the fused image is delivered via the local connection. If a recipient device is reachable by a cellular connection (e.g., when a user is at home, while the user's intended recipient is at school), the fused image is delivered via the cellular connection. For example, after determining that two of the five intended recipient devices (102B and 102C) are reachable by a local connection (e.g., a home WIFI network), while the remaining three intended recipient devices (102D, 102E, and 102F) are reachable by an Internet connection (e.g., via a cable or satellite network), a hands free computing device transmits a fused image to recipients 102B-102C and 102D-102F, via the local connection and the Internet connection, respectively.

In some implementations, the user profile module 122 provides and accumulates information about a user, from the interactions of the user with a video game or from other sources (e.g., information entered by the user into a registered email account, such as a GMAIL account, or a confirmed social networking account, such as a FACE BOOK account). In some implementations, the user profile module 122 provides information to the game configuration module 118, such that different game configurations are provided to different users with different profiles. For example, in some embodiments, for users with college education, more sophisticated game configurations (e.g., a fused image with sophisticated words or phrases) are provided, whereas for users who are still in grade school, fused images with simple (e.g., less complicated/sophisticated) words or phrases, e.g., "today" and "school," are provided. In some implementations, a plurality of user profiles 314 corresponding to a plurality of users are maintained, e.g., using the user profile database 158. In some implementations, each respective user profile 314 in the plurality of user profiles comprises one or more user profile parameters 316 (e.g., age, educational level, gaming history, purchasing history, language preferences, geographical location, means of communication, a mobile phone number, residence information, licensed games, in-game rewards, out-of-game rewards, current game level in each licensed games, etc.) about a corresponding user in the plurality of users.

In some implementations, the reward management module 126 provides one or more rewards or incentives to a user, e.g., for completing a task, as encouragement to repeat a failed task, for applying a credit or the like (generated by a game publisher or by a peer user). In some implementations, in-game rewards include one or more of the following: gaming credits, bonus games, bonus game levels, bonus characters, bonus powers, and extended game play. In some implementations, out-of-game rewards include one or more of the following: discounts, vouchers, coupons, tickets, and monetary awards.

In some implementations, the multi-user management module 128 coordinates communication between two or more users (e.g., video game players), for instance by exchanging gaming progress (e.g., game statistics 133) between two users who are both playing a shooting game, exchanging credits and feedback (e.g., user feedback 135) between different users, and initiating an instant messaging chat between two or more users.

In some implementations, the communication network 104 interconnects one or more computing devices 102 with each other, and with the gaming server system 106. In some implementations, the communication network 104 optionally includes the Internet, one or more local area networks (LANs), one or more wide area networks (WANs), other types of networks, or a combination of such networks.

In some implementations, the location connection 103 interconnects one or more computing devices 102 with each other. In some implementations, the location connection 103 optionally includes a cellular connection, a Bluetooth connection, an infrared connection, and a cable connection.

In some implementations, the gaming server system 106 includes a configuration module 152, a feedback management module 160, a video game database 154, a reward database 156 and a user profile database 158. In some implementations, the video game database 154 includes one or more video games 162. In some embodiments, such video games are provided to one or more users of computing devices 102. In some embodiments, this distribution of video games 162 is provided to users of computing devices 102 under any number of licensing schemes, such as for a fee, for free with advertisements, or for free without advertisements.

In some implementations, the gaming server system 106 manages a set of game configurations (e.g., fused images representing different levels of a video spelling game), and tracks user activities with respect to each such game configuration. For example, after detecting that a user has completed ten game configurations (e.g., ten fused images with different phrases and background images) within one hour of game play, the gaming server system 106 flags a user profile for the user to note that the user is a sophisticated user, and recommends game configurations having similar or increased complexity or sophistication to the user in the future. In another example, after detecting that a user has attempted more than a predetermined number of times (e.g. 100 times) in a predetermined period of time (e.g., the past week)—without finishing successfully—the same game configuration (e.g., a fused image having a sophisticated phrase) generated by another user or a video game provider, the gaming server system 106 notifies the other user or the video game provider of the user's progress (or lack thereof) with respect to the game configuration, and potential user frustrations associated therewith, and optionally offers the user additional instructions and/or disbursement of a credit to the user for the user's efforts.

In some implementations, the feedback management module 160 collects user feedback given explicitly (e.g., a user comment that a game configuration is "fun" or "BEAUTIFUL!") or implicitly (e.g., leaving a game one minute after starting it and never returning), and updates the user profile database 158 in accordance therewith. In some implementations, the video game database 154 stores one or more video game configurations, such as fused image with different characters, words, phrases, sentences, and paragraphs. In some implementations, each fused image includes one or more graphic background. For example, a fused image having a grade-school level phrase, e.g., "Christmas," may include one or more related cartoon characters, e.g., a Santa Claus with two reindeers, in the background, a fused image having a college level phrase "ad hominem" may include ancient Greek philosopher (e.g., Aristotle) in the background. In some implementations, the background of a fused image is selected from an image database without user/human intervention in accordance with a chosen word or phrase included in the fused image. For example, when a user speaks the word "independence," an image of the liberty bell is used (with appropriate licensing/copyright permissions) as part of the background for a fused image. In some implementations, background of a fused image is selected from an open source online image database, such as the Google Image database or the Getty Images database.

In some implementations, the video game database 154 stores one or more video games, such as shooting games, zombie games, spelling game, virtual reality games, puzzle games, and role play games, game configurations, and fused images related to one or more of these games.

In some implementations, the reward database 156 stores one or more rewards that can be disbursed to users, such as in-game credits (e.g., a bonus level), out-of-game credits (e.g., a coupon), virtual currency applicable to two or more games, virtual currency recognized by a group of users, and/or real currency.

In some implementations, the user profile database 158 stores information about a group of users. Exemplary information includes, but is not limited to user age, educational level, gaming history, purchasing history, language preferences, geographical location, means of communication (e.g., a mobile phone number), and/or residence information.

Figure 2:
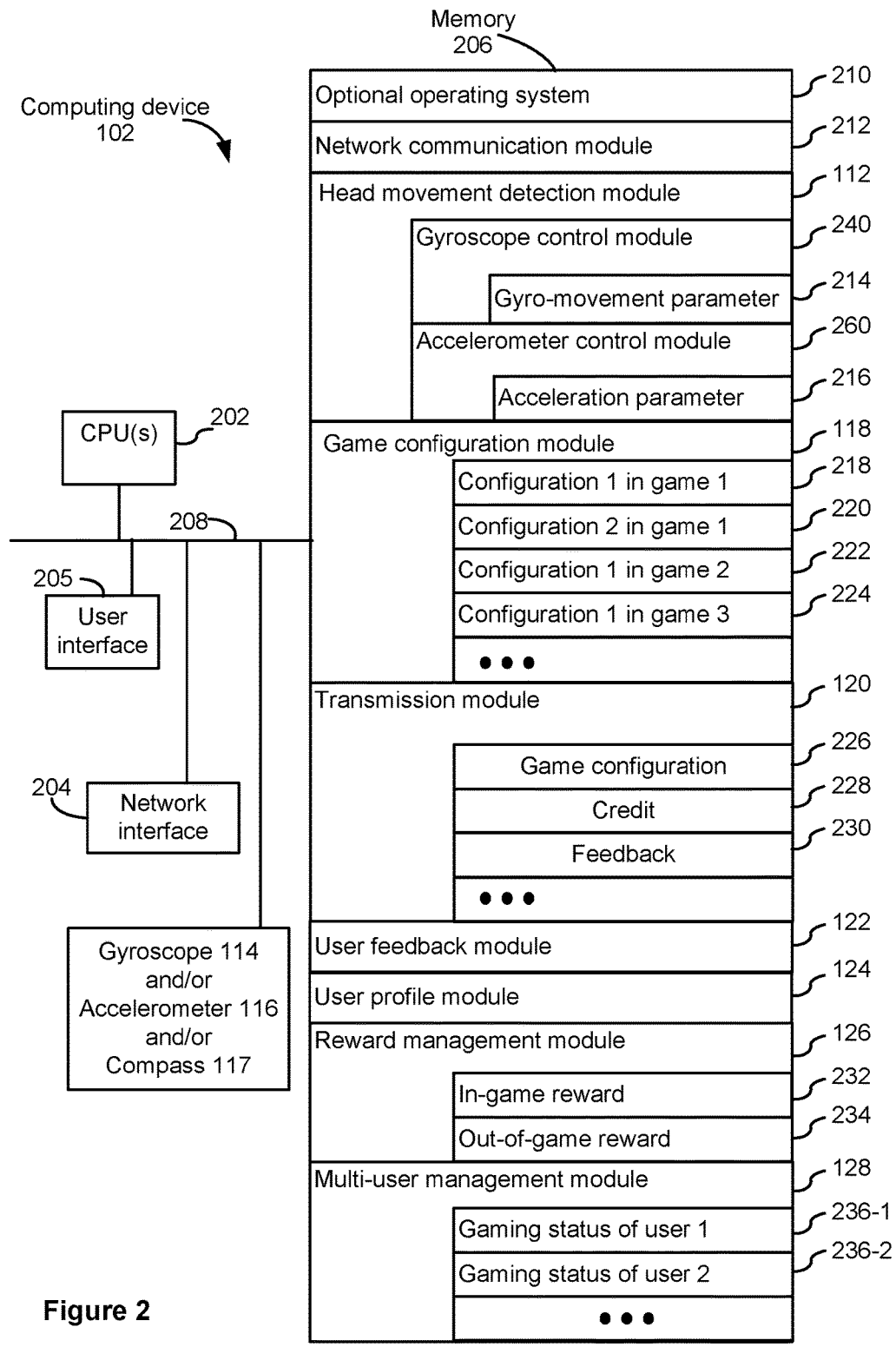
FIG. 2 is an example block diagram illustrating a hands free computing device, in accordance with some implementations of the present disclosure.

FIG. 2 is an example block diagram illustrating a hands free computing device 102, in accordance with some implementations of the present disclosure. The hands free computing device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices, and optionally includes non-volatile memory, such as one or more magnetic disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

optionally, an operating system 210, which includes procedures for handling various basic system services and for performing hardware dependent tasks;

a network communication module (or instructions) 212 for connecting the device 102 with other devices (e.g., the gaming server system 106 and the computing devices 102B . . . 102N) via one or more network interfaces 204 (wired or wireless), and/or the communication network 104 (FIG. 1);

a head movement detection module 112 for sensing one or more characteristics of user head movements, such as detecting whether a user has nodded their head, whether a user is shaking their head swiftly or slowly or leaning backwards or forwards, in some implementations, the head movement detection module 112 includes:

a gyroscope control module 240 for detecting/sensing, via the gyroscope 114, one or more gyro-movement parameters 214 concerning a user's head movement, e.g., whether a user is leaning their head backwards or forwards or rotating their head clockwise or counter clockwise; and an accelerometer control module 260 for detecting/sensing, via the accelerometer 116, one or more acceleration parameters 216 concerning a user's head movement, e.g., whether a user is swiftly or slowly shaking their head;

a game configuration module 118 for maintaining several game configurations, e.g., using a lookup table, including:

configuration 1 in game 1, e.g., designed and kept private by a user;

configuration 2 in game 1, e.g., designed by a game provider and made accessible to a group of subscribers for a fee;

configuration 3 in game 1, e.g., shared by a group of particular users (e.g., twenty preschoolers in Palo Alto, Calif.);

configuration 1 in game 2, e.g., a backup copy of a game configuration saved on the computing device 102A; and configuration 1 in game 3, e.g., a game configuration being transmitted, via the communication network 104 or the local connection 103, from one user to another user;

a transmission module 120 for transmitting (e.g., sending and receiving) game configurations 226, credits (in-game or out-of-game) 228, and user feedback 230 to and from one or more users;

a user feedback module 122 for collecting user feedback given expressly or impliedly towards a video game;

a user profile module 124 for recording, tracking, and storing various information about a user, so as to build a profile of the user, such as a user's education, age, gender, purchasing preferences, and/or gaming history;

a reward management module 126 for disbursing in-game rewards 232 and out-of-game rewards 234 to a user; and a multi-user management module 128 for coordinating gaming progress between multiple users engaging in the same gaming application (e.g., gaming status of user 1 "236-1", gaming status of user 2 "236-2", and so forth), and facilitating the communication between these users (e.g., via an instant messaging application).

In some implementations, the user interface 205 includes an input device (e.g., a button, a camera, or a microphone) for a user to interact with the computing device 102. In some implementations, the gyroscope 114, and/or optionally the accelerometer 116, and/or optionally the compass 117 is considered to be part of the user interface 205.

In some implementations, the head movement detection module 112 includes a gyroscope control module 240 for sensing user head movements. In some implementations, such user head movements can be parameterized into gyro-movement parameters 214. Examples of gyro-movement head parameters in some implementations include forward 30 degrees, left 10 degrees, north 90 degrees, and south 30 degrees, and so forth. In some embodiments, the accelerometer control module 260, like the corresponding accelerometer 116, is optional. In some embodiments the accelerometer control module 260 measures speed or acceleration of user head movements. In some embodiments, the measurements of the accelerometer 116 are parameterized by accelerometer control module 260 into one or more acceleration parameters 216 (e.g., forward at 10 cm per second, 10 cm per second per second, backwards at 1 cm per second, backwards at 1 cm per second, or clockwise continuously, etc.).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
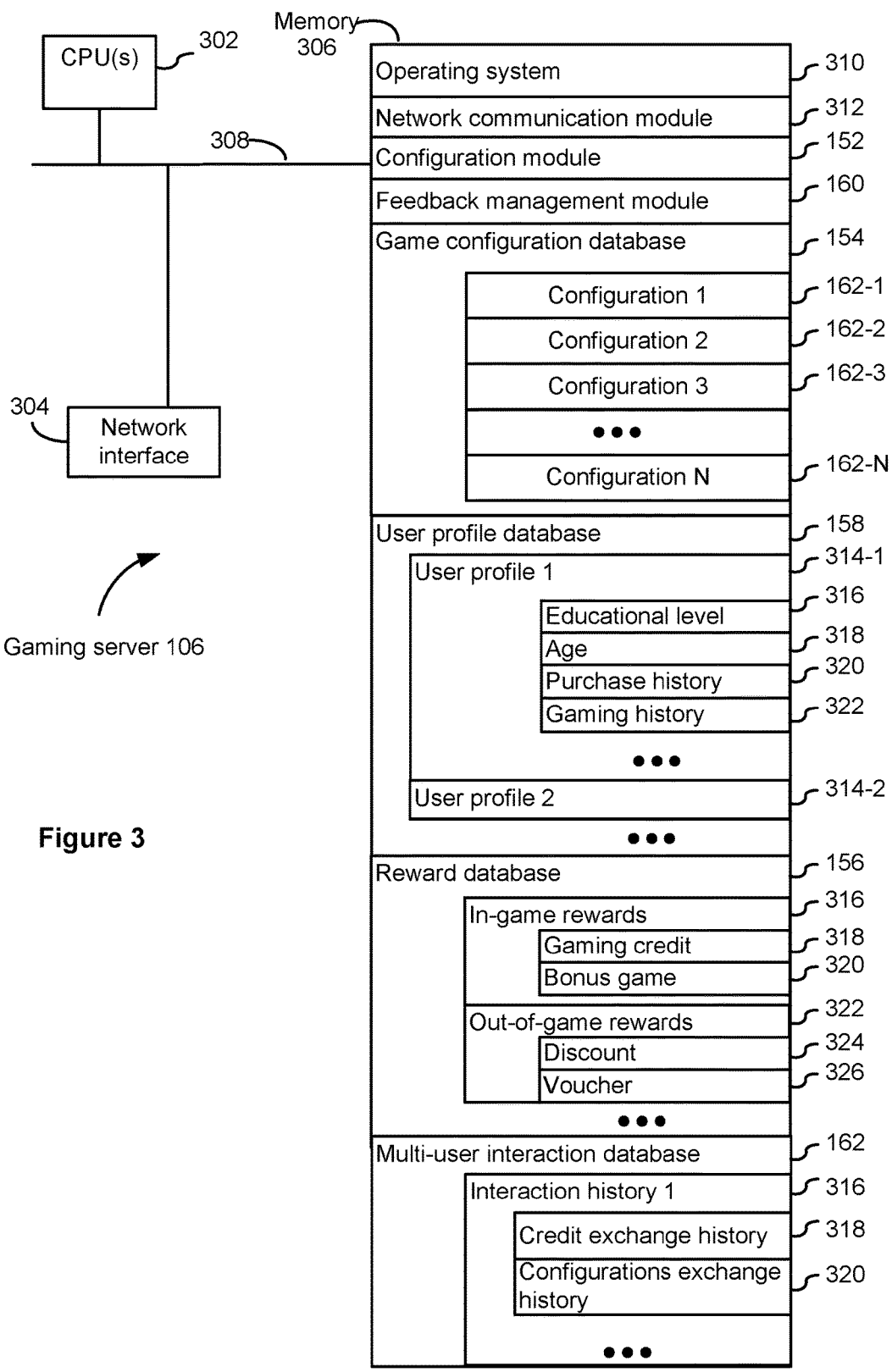
FIG. 3 is an example block diagram illustrating a gaming server system, in accordance with some implementations of the present disclosure.

FIG. 3 is an example block diagram illustrating a gaming server system 106, in accordance with some implementations of the present disclosure. The gaming server system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

an operating system 310, which includes procedures for handling various basic system services and for performing hardware dependent tasks;

a network communication module (or instructions) 312 for connecting the gaming system 106 with other devices (e.g., the computing devices 102) via the one or more network interfaces 304 (wired or wireless), or the communication network 104 (FIG. 1);

a configuration module 152 for managing a set of gaming applications and configurations (e.g., video games and levels within one or more video games), and tracking user activities within such gaming applications and configurations;

a feedback management module 160 for collecting user feedback given explicitly (e.g., a user comment that a game is "fun") or implicitly (e.g., leaving a game configuration before completing a predetermined portion thereof and never returning), and updating a user profile database 158 in accordance with collected user feedback;

a game configuration database 154 for maintaining configurations (e.g., 162-1 to 162-n) of various video games;

a user profile database 158 for maintaining a plurality of user profiles (e.g., user profile 314-1, 314-2 ... 314-n) corresponding to a plurality of users; in some implementations, a user profile 314-1 includes such information concerning a user as educational level 316, age 318, purchase history 320, gaming history 322, language preferences, geographical location, means of communication (e.g., a mobile phone number), and residence information;

a reward database 156 for storing in-game rewards compilations (e.g., a number of in-game rewards 316 and conditions for achieving such awards) and out-of-game rewards compilations (e.g., a number of out-of-game rewards 322 and conditions for achieving such awards) or storing one or more rewards that can be disbursed to system users; exemplary in-game rewards 316 include gaming credits 318, bonus games 320, bonus game levels, bonus characters, bonus powers, extended game play, and exemplary out-of-game rewards 322 include discounts 324, vouchers 326, coupons, tickets, and monetary awards; and a multi-user interaction database 162 for coordinating and tracking communications among a group of users, e.g., credit exchange history 318 (such as a list of virtual currency exchanges among a group of professional game players) and configuration exchange history 320 (such as a list of gaming configurations, e.g., fused images, provided by a professional game provider and subscribed to by a number of paid users).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "computing device 102" and a "gaming server 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

Figure 4:
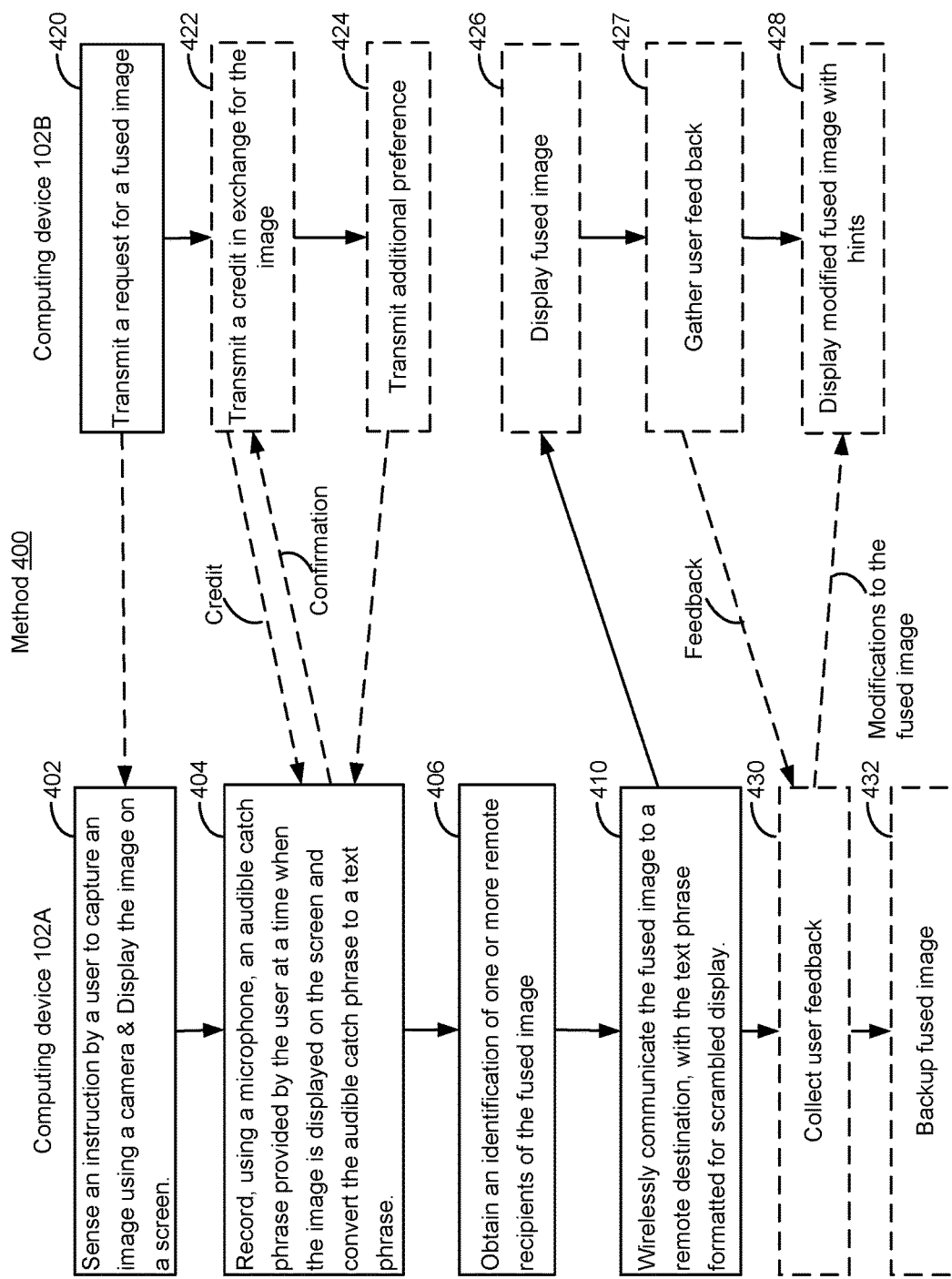
FIG. 4 is an example flow chart illustrating a method for providing a fused image using a hands free computing device, in accordance with some implementations of the present disclosure.

FIG. 4 is a flow chart illustrating a method 400 for providing a fused image using a hands free computing device, e.g., implemented at the computing device 102, in accordance with some implementations.

In some implementations, the computing device 102A senses (402) an instruction by a user of the computing device 102A to capture an image using a camera (e.g., associated with, such as integrated directly into the case of, the computing device 102A), and after capturing the image, displays the image on a display device associated with the computing device 102A, e.g., a computer screen, a TV screen, and a screen of a Google Glass device.

In some implementations, the image is captured responsive to a request by another user (also called an on-demand mode), e.g., a user of the computing device 102B. For example, with appropriate permissions, images captured by the computing device 102A are provided within a predefined time interval of their capture (e.g., on a real time basis) to a user of the computing device 102B. For another example, an elementary school student can, from a school classroom, view images captured by a fellow student who is on a field trip in the Grand Canyon National Park, and request that these images be used as part of (e.g., background) of a fused image. In some implementations, to request an image be captured by the computing device 102, the computing device 102B transmits (420) such a request to the computing device 102A.

In some implementations, responsive to sensing the instruction by the user, the computing device 102A (i) records (404), using a microphone, an audible catch phrase provided by the user at a time when the image is displayed on the screen, and (ii) then converts, using speech recognition techniques, the audible catch phrase to a text phrase.

In some implementations, in exchange for requesting a fused image, a user of the computing device 102B transmits a credit to that of the computing device 102. In some implementations, the computing device 102B also transmits additional preferences regarding the image, before, after, or concurrently with a confirmation by the computing device 102A. For example, a user can request a fused image be generated with words or phrases having less than 10 characters (e.g., the word "Christmas"), and/or include a visual hint (e.g., a Santa Claus).

In some implementations, after creating the fused image, the computing device 102A obtains (406) an identification of one or more remote recipients of the fused image. For example, a user of the computing device 102A can select recipients of the fused image from a contact list.

In some implementations, the computing device 102A wirelessly communicates (410), e.g., via a cellular network or a WIFI network, the fused image to a remote destination, with the text phrase formatted for scrambled display.

In some implementations, after receiving the fused image, the computing device 102B displays (426) the fused image, e.g., on a computer screen or a TV screen (during a family event).

In some implementations, optionally, with appropriate permissions, the computing device 102A collects user feedback from the computing device 102B (427/430). In some implementations, the feedback includes user feedback given explicitly (e.g., a user comment that a game configuration is "fun" or "BEAUTIFUL!") or implicitly (e.g., leaving a game one minute after starting it and never returning).

In some implementations, optionally, based on the feedback, the computing device 102A optionally provides (automatically, without user/human intervention) one or more modifications to the fused image to the computing device 102B. For example, if a user has expressed frustration towards a fused image previously transmitted (e.g., through a captured facial or verbal expression, a confused face or mumbling "This is too HARD."), one or more visual hints are provided to the user, in order to enhance user experience or to ease user frustration (428). In another example, if a user has successfully completed a predefined number of games within a predefined time interval, indicative of user sophistication, complexity level is increased in future games.

In some implementations, optionally, the computing device 102A optionally backs up (432) the fused image either locally or remotely, for example on the computing device 102A or onto the gaming server system 106, respectively.

Figure 5:
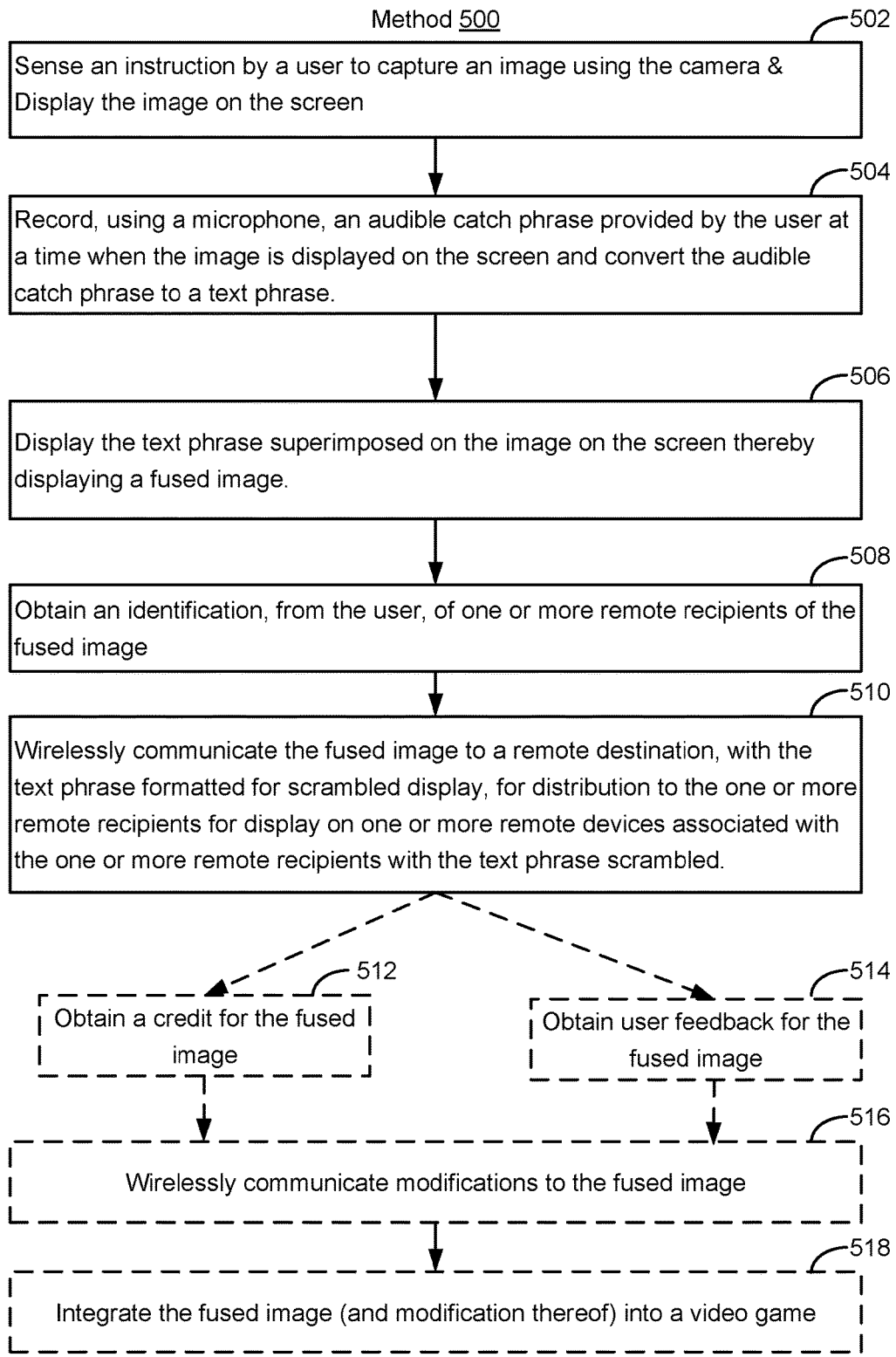
FIG. 5 is an example flow chart illustrating methods for reviewing a fused image using a hands free computing device in accordance with some implementations of the present disclosure.

FIG. 5 is an example flow chart illustrating a method 500 for providing a fused image using a hands free computing device in accordance with some implementations of the present disclosure. In some embodiments, the fused image is provided as part of a video game, e.g., a bonus game, a bonus level, a user challenge, a requirement for receiving in-game or out-of-game credit, etc. In some embodiments, the video game is a spelling game for words or phrases. In some implementations, the video game is a hunting game (e.g., the DEER HUNTER game by GLU MOBILE INC., San Francisco, Calif.), a first person shooting game (FPS), a virtual reality game (VR), a role-playing game (RPG), a spelling game (e.g., the SPELLISTA game by GLU MOBILE INC.), a zombie game, or a puzzle game.

Figure 6:
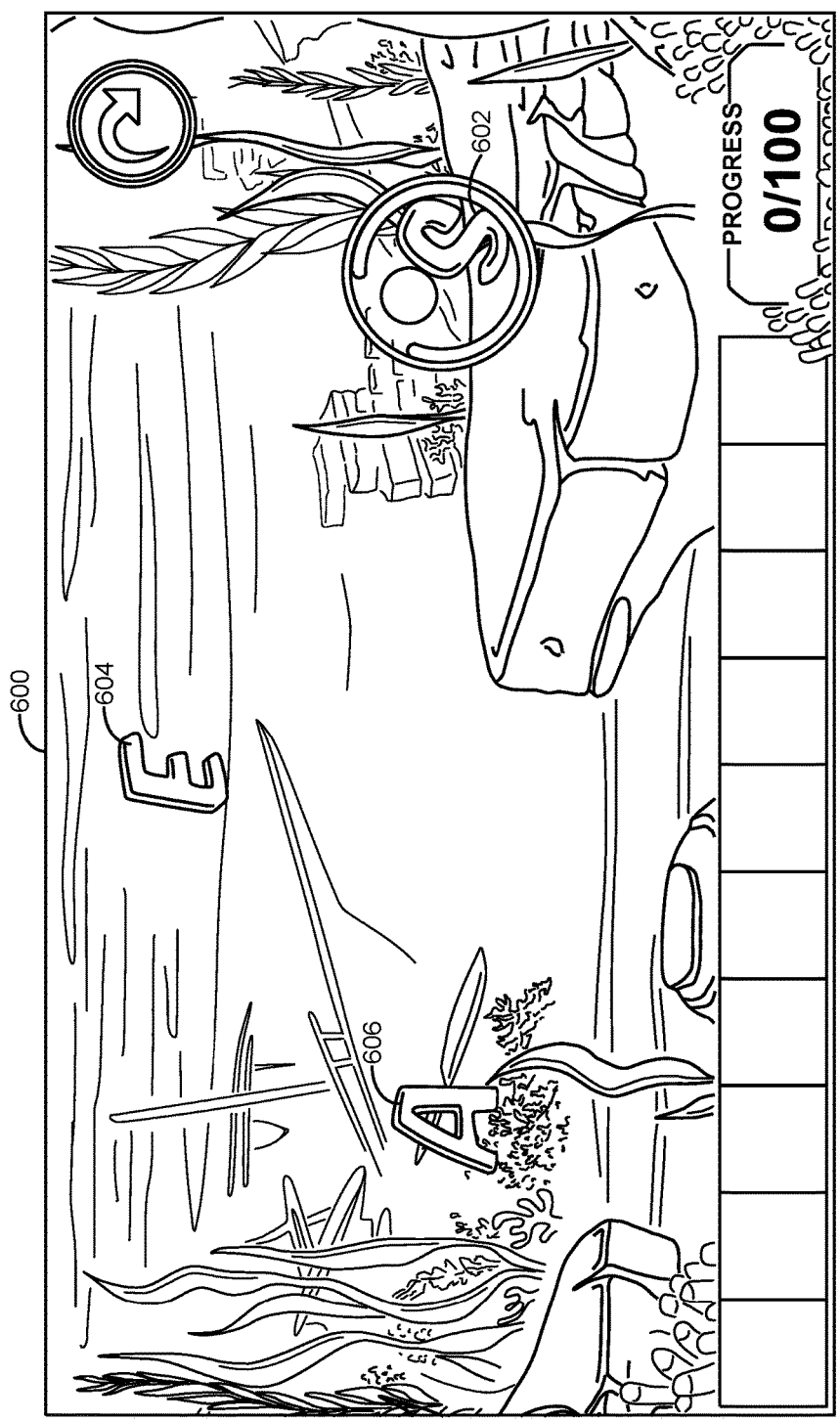
FIGS. 6-7 are screen images showing providing fused images to remote recipients for descrambling and interpretation, in accordance with an embodiment of the present disclosure.
Figure 7:
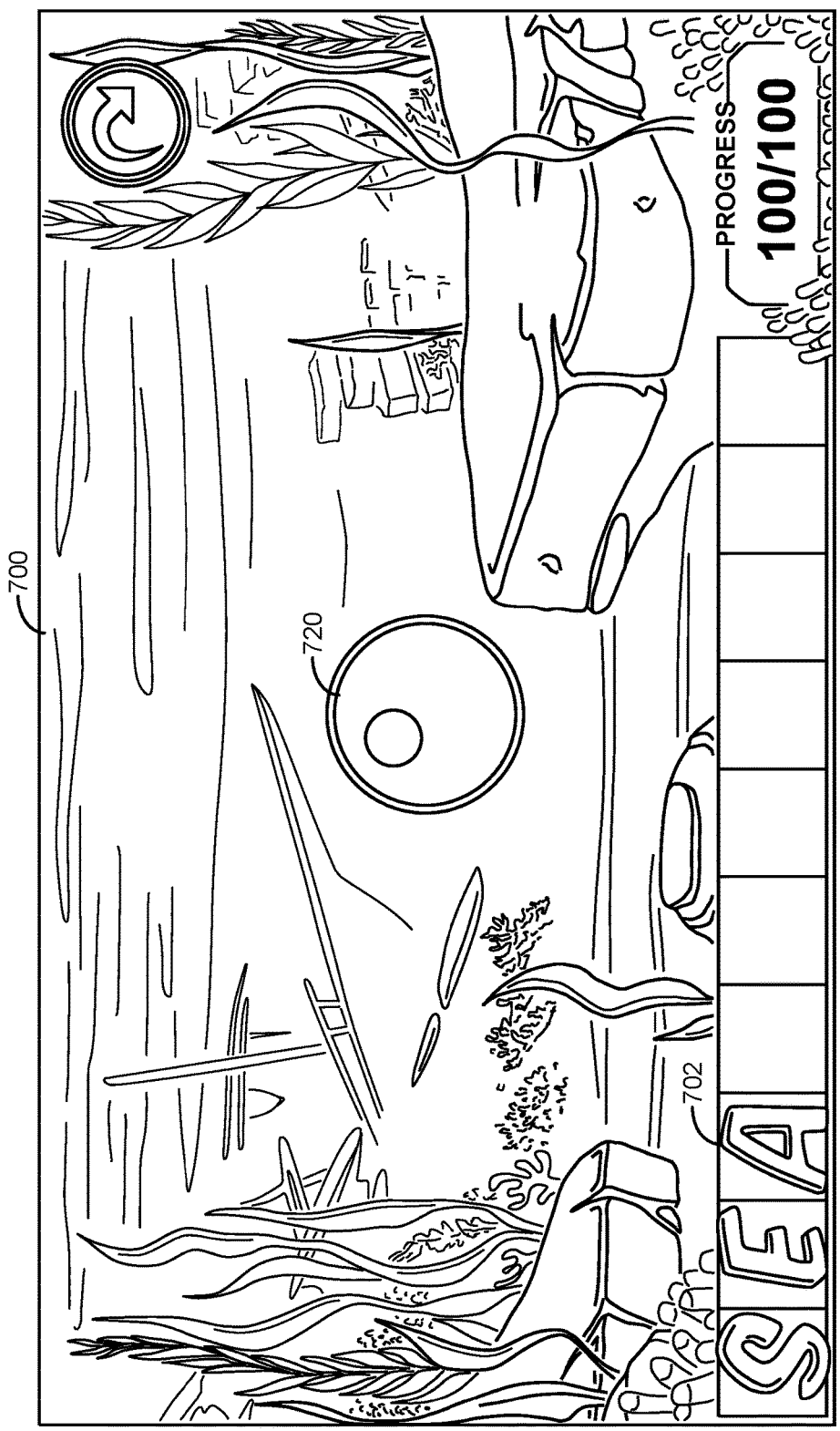

FIG. 5 is described in conjunction with FIGS. 6-7, which provide screen images showing an example user interface for providing a fused image using a hands free computing device, in accordance with some implementations.

In some implementations, a first hands free computing device comprises one or more processors, one or more head movement measuring components, a screen, a camera, a microphone, and memory storing one or more programs for execution by the one or more processors. In some embodiments, the first hands free computing device is attached to the user's head. In some embodiments, the first hands free computing device is a mobile device, a computing cloud-enabled device and/or an Internet-enabled device. In some embodiments, the first hands free computing device is connected with the Internet using one of: a cellar network connection, a wireless connection, a Bluetooth connection, and an infrared connection.

In some implementations, the method 500 comprises, responsive to sensing an instruction by a user, capturing an image using the camera and displaying (502) the image on the screen. The instruction may be delivered orally by a microphone, by touch using a touch pad, or by a predetermined head movement. In some embodiments, the instruction by the user to capture the image using the camera is one of: (i) one or more predetermined oral instructions, (ii) one or more predetermined head movements, or (iii) a combination of one or more predetermined oral instructions and one or more predetermined head movements.

In some embodiments, the method 500 further comprises recording, using the microphone, an audible catch phrase provided by the user at a time when the image is displayed on the screen, and converting (504) the audible catch phrase to a text phrase. In some embodiments, the text phrase comprises a plurality of words. In some embodiments, the plurality of words communicate a single phrase (e.g., "I love you") whereas in other embodiments the plurality of words do not communicate a single phrase but rather are independently associated with the image (e.g., the names of different types of fish in an image of a fish tank).

In some embodiments, the method 500 further comprises formatting the text phrase, in the fused image for distribution to the one or more remote recipients, for sequential scrambled display of each word in the plurality of words. In some embodiments, the method 500 further comprises receiving instructions to format the text phrase, in the fused image for distribution to the one or more remote recipients, for sequential scrambled display of each word in the plurality of words in the same order of the corresponding words in the audible catch phrase. In some embodiments, the instructions to format the text phrase are communicated to the first hands free computing device by one or more head movements that are sensed via the one or more head movement measuring components. In some embodiments, the method further comprises receiving instructions to format the text phrase, in the fused image for distribution to the one or more remote recipients, for sequential scrambled display of each word in the plurality of words in an order that is different than the order of the corresponding words in the audible catch phrase.

In some embodiments, the instructions to format the text phrase are communicated to the first hands free computing device by one or more head movements that are sensed via the one or more head movement measuring components.

In some implementations, the method 500 further comprises obtaining (508) an identification, from the user, of one or more remote recipients of the fused image. In some embodiments, the obtaining step 508 makes use of one or more predetermined head movements by the user that are sensed via the one or more head movement measuring components. In some embodiments, the one or more head movement measuring components include a gyroscope and/or an accelerometer and/or a compass.

In some embodiments, the obtaining step 508 makes use of one or more oral commands by the user that are determined via a microphone. In some embodiments, obtaining the identification comprises comparing a characteristic of a head movement sensed by the one or more head movement components to a characteristic of a stored library of head movement commands. For instance, in some embodiments, the characteristic is one or more of (i) a speed associated with the sensed head movement, (ii) an acceleration associated with the sensed head movement, (iii) a degree of the sensed head movement, and (iv) a direction of the sensed head movement.

In some embodiments, the obtaining step 508 makes use of a profile associated with the user that comprises identification information for the one or more remote recipients. In some embodiments, the profile associated with the user includes information obtained from an email account associated the user. In some embodiments, the profile associated with the user includes information obtained from a social networking account associated the user. In some embodiments, the profile associated with the user includes information identifying one of: an age of the user, an education level of the user, a language preference of the user, a gender of the user, a physical handicap associated with the user, and a geographical location of the user. In some embodiments, the identification information for the one or more remote recipients includes an E-mail address or social networking address of each of the one or more remote recipients.

In some implementations, the method 500 additionally comprises, wirelessly communicating (510) the fused image, e.g., using a WIFI connection or a cellular connection, to a remote destination, with the text phrase formatted for scrambled display. From the remote destination, the fused image is distributed to the one or more remote recipients for display on one or more remote devices associated with the one or more remote recipients with the text phrase scrambled. In some embodiments, a remote destination (remote device) is a second hands free computing device.

In some embodiments, the method 500 further comprises obtaining a confirmation by the user that the text phrase is correct prior to wirelessly communicating the fused image. In some embodiments, the confirmation is communicated to the first hands free computing device by one or more head movements that are sensed via the one or more head movement measuring components.

In some embodiments, the method 500 optionally comprises obtaining (512) a credit for transmitting the fused image. For example, a video game player is rewarded for providing to the game publisher a sample bonus level created by the player and approved for integration to a video game by the publisher.

In some embodiments, the method 500 optionally comprises obtaining (514) user feedback for the fused image. For example, a first player, with appropriate permissions, can receive express or implicit feedback with respect to the fused image, from a second player, so as to improve user experience and detect user preferences.

In some embodiments, upon obtaining the credit or the feedback, the method 500 optionally comprises wirelessly communicating (516) one or more modifications to the fused image. For example, upon detecting a potential user frustration for failing to solving a puzzle gaming, one or more visual hints are provided or complexity level reduced. In another example, upon obtaining a credit, a bonus level within the fused image is made available (also called unlocked) for the user of the computing device 102.

In some embodiments, the method 500 optionally comprises integrating (518) the fused image and one or more modifications thereof into a video game. For example, after detecting that a user has successfully resolved a puzzle game embedded in the fused image, the user is invited to solve more puzzle games to continue on, or switch to another video game that the user may also be interested in.

Another aspect of the present disclosure provides a method for reviewing a fused image using a hands free computing device. The hands free computing device comprises one or more processors, one or more head movement measuring components, a screen, and a memory storing one or more programs for execution by the one or more processors.

In some embodiments, the method comprises receiving a fused image from a remote destination. The fused image comprises a scrambled text phrase formatted for scrambled display and an associated image. The scrambled text phrase comprises a plurality of scrambled words. The associated image is displayed on the screen. In some embodiments, a first scrambled word in the plurality of scrambled words is also displayed on the display as a first plurality of letters superimposed on all or a portion of the associated image.

In some embodiments, one or more head movements of the user are sensed via the one or more head movement measuring components within the computing device. In some embodiments, the one or more head movements serve to identify a letter in the first plurality of letters. In some embodiments, the method then proceeds by acting upon the one or more head movements, the acting comprising (i) pulling the identified letter to a word construction zone on the display when the identified letter matches the correct letter of the first scrambled word, or (ii) forgoing pulling the identified letter to a word construction zone on the display when the identified letter does not match the correct letter of the first scrambled word. In some embodiments, the steps of sensing head movements and acting upon them in the above-identified manner continue until the plurality of letters has been pulled into the word construction zone.

In some embodiments, the method comprises executing the aforementioned displaying, sensing, acting, and repeating steps for each respective word in the plurality of words. In some embodiments, the method comprises executing the aforementioned displaying, sensing, acting, and repeating steps for each respective word in the plurality of words until the user commits a predetermined number of errors (e.g., wrong letter choices). In some embodiments, the method comprises executing the aforementioned displaying, sensing, acting, and repeating steps for each respective word in the plurality of words until a predetermined amount of time has elapsed.

In some embodiments, the one or more head movement measuring components include a gyroscope, an accelerometer, or a compass. In some embodiments, acting upon the one or more head movements comprises comparing a characteristic of a head movement sensed by the one or more head movement components to a characteristic of a stored library of head movement commands. In some embodiments, the characteristic is one or more of (i) a speed associated with the sensed head movement, (ii) an acceleration associated with the sensed head movement, (iii) a degree of the sensed head movement, and (iv) a direction of the sensed head movement.

In some embodiments, the hands free computing device is attached to the user's head. In some embodiments, the hands free computing device is a mobile device, a computing cloud-enabled device and/or an Internet-enabled device. In some embodiments, the hands free computing device is connected with the Internet using one of: a cellar network connection, a wireless connection, a Bluetooth connection, and an infrared connection.

In some embodiments, the scrambled text phrase is formatted for sequential scrambled display of each word in the plurality of scrambled words. In some embodiments, the method further comprises (i) tracking an amount of time that takes the user to descramble the plurality of scrambled words, and (ii) communicating an accolade or reward to the user when the words are descrambled within a predetermined amount of time. In some embodiments, an identity of the accolade or reward is determined by an amount of time that takes user to descramble the plurality of words.

In some embodiments, the method further comprises tracking a number of errors incurred by the user when descrambling the plurality of scrambled words and communicating an accolade or reward to the user when the words are descrambled with less than a predetermined number of errors. In some embodiments, an identity of the accolade or reward is determined by a number of errors incurred by the user in descrambling the plurality of words. In some embodiments, an error is the selection of an incorrect alphanumerical character.

In some embodiments, the plurality of words collectively encodes a single phrase for the associated image. In some embodiments, the plurality of words collectively encodes a plurality of words or phrases for the associated image.

As FIG. 6 illustrates, after capturing an image (e.g., an image with sea plants), an audible catch phrase ("SEA") is captured. As FIG. 6 illustrates, the catch phrase "SEA" is converted into text phrase "SEA" (case sensitive or otherwise) and superimposed on the image, as separated characters/phrases 602, 604, and 606. The location of each character/phrase within the fused image is determined randomly or in accordance with a user head movement (e.g., a user can move a character using a head movement).

As FIG. 7 illustrates, after obtaining/receiving a fused image, a user completes a puzzle game encoded in the fused image, by organizing characters located at various different locations of the fused in a correct sequence 702. In some embodiments, this involves dragging a visual element, such as bubble 720 onto each letter in the correct order. In some embodiments, when the user drags bubble 720 onto the correct letter in a sequence of letters using head movements, the letter drags to the bottom of the screen without human intervention. In some embodiments, when the user drags bubble 720 onto the correct letter in a sequence of letters using head movements, the user must also drag the letter to the bottom of the screen using head movements.

In some cases, where a particular sequence is immaterial (e.g., for the word "SEE," which letter "E" is organized into sequence first may not be important), a user is allowed to pursue either consequence. In some cases, where a particular sequence is material (e.g., for the word "SEA," the letter "E" should be organized into the sequence before the letter "A" is), a user is expected to follow a particular consequence in order to complete the game.

In some cases, where there are two or more potential solutions to a puzzle game, e.g., in some cases, for fused image shown in FIG. 6, either the word "SEA" or the word "SEE" would suffice, either solution proposed by a user can complete the game. In other implementations, when two or more solutions would suffice, one particular solution is associated with more reward than other solutions. For example, in some cases, both the phrase "SEA PLANT" and the word "SEA" would suffice, a user is awarded more in-game credit for proposing "SEA PLANT," due to its increased complexity.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first user could be termed a second user, and, similarly, a second user could be termed a first user, without changing the meaning of the description, so long as all occurrences of the "first user" are renamed consistently and all occurrences of the "second user" are renamed consistently. The first user, and the second user are both users, but they are not the same user.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computing device comprising one or more processors, one or more head movement measuring components, a screen, a camera, a microphone, and memory storing one or more programs for execution by the one or more processors, the one or more programs collectively comprising instructions for:
    responsive to sensing an instruction by a user:
        capturing an image using the camera; and
        displaying the image on the screen;
    while displaying the image on the screen, receiving, using the microphone, an audible phrase provided by the user;
    in response to receiving the audible phrase provided by the user:
        converting the audible phrase to a text phrase; and
        displaying the text phrase superimposed on the image on the screen, without human intervention, thereby displaying a fused image;
    obtaining an identification, from the user, of one or more remote recipients of the fused image; and
    in accordance with a confirmation by the user that the text phrase has been correctly converted from the audible phrase by the converting step, formatting the text phrase for scrambled display in accordance with a level of complexity stored in a user profile associated with each recipient in the one or more remote recipients and wirelessly communicating the fused image to the one or more remote recipients for display on one or more remote devices associated with the one or more remote recipients with the text phrase scrambled.

2. The computing device of claim 1, wherein the confirmation is detected by the computing device by one or more head movements that are sensed via the one or more head movement measuring components.

3. The computing device of claim 1, wherein the instruction by the user to capture the image using the camera is one of: (i) one or more predetermined oral instructions, (ii) one or more predetermined head movements, or (iii) a combination of one or more predetermined oral instructions and one or more predetermined head movements.

4. The computing device of claim 1, wherein the obtaining the identification comprises:
   comparing a characteristic of a head movement sensed by the one or more head movement measuring components to a characteristic of a stored library of head movement commands, and
   the characteristic is one or more of (i) a speed associated with the sensed head movement, (ii) an acceleration associated with the sensed head movement, (iii) a degree of the sensed head movement, and (iv) a direction of the sensed head movement.

5. The computing device of claim 1, wherein the obtaining the identification, from the user, makes use of a profile associated with the user that comprises identification information for the one or more remote recipients.

6. The computing device of claim 5, wherein the profile associated with the user includes information identifying one of:
   an age of the user,
   an education level of the user,
   a language preference of the user,
   a gender of the user,
   a physical handicap associated with the user, and
   a geographical location of the user.

7. The computing device of claim 1, wherein the text phrase is a plurality of words, and wherein the one or more programs collectively further comprise instructions for formatting the text phrase, in the fused image, for distribution to the one or more remote recipients, for sequential scrambled display of each word in the plurality of words.

8. The computing device of claim 1, wherein the text phrase is a plurality of words, and wherein the one or more programs collectively further comprise instructions for receiving instructions to format the text phrase, in the fused image, for distribution to the one or more remote recipients, for sequential scrambled display of each word in the plurality of words in the same order of the corresponding words in the audible phrase.

9. The computing device of claim 8, wherein the instructions to format the text phrase are sensed via the one or more head movement measuring components.

10. The computing device of claim 1, wherein the text phrase is a plurality of words, and wherein the one or more programs collectively further comprise instructions for: receiving instructions to format the text phrase, in the fused image, for distribution to the one or more remote recipients, for sequential scrambled display of each word in the plurality of words in an order that is different than the order of the corresponding words in the audible phrase.

11. The computing device of claim 10, wherein the instructions to format the text phrase are one or more head movements that are sensed via the one or more head movement measuring components.

12. The computing device of claim 1, wherein the obtaining the identification, from the user, makes use of a profile associated with the user that includes information identifying an age of the user, an education level of the user, a language preference of the user, a gender of the user, a physical handicap associated with the user, and a geographical location of the user.

13. The computing device of claim 1, wherein the one or more programs collectively further comprise instructions for providing a credit to the user for transmitting the fused image.

14. The computing device of claim 1, wherein the level of complexity associated with a first recipient in the one or more remote recipients is increased when the first recipient has successfully determined a predefined number of text phrases in a predefined time interval.

15. A computing device comprising one or more processors, one or more head movement measuring components, a screen, and a memory storing one or more programs for execution by the one or more processors,
   the one or more programs collectively comprising instructions for:
   (A) obtaining a fused image, wherein the fused image comprises a scrambled text phrase and an associated image, the scrambled text phrase comprising a plurality of scrambled words formatted for scrambled display in accordance with a level of complexity stored in a user profile associated with a user of the computing device;
   (B) displaying the associated image on the screen;
   (C) while displaying the associated image on the screen, displaying a first scrambled word in the plurality of scrambled words on the screen as a first plurality of letters superimposed on all or a portion of the associated image;
   (D) while displaying the first scrambled word and the associated image, sensing one or more head movements of a user via the one or more head movement measuring components, wherein the one or more head movements serve to identify a letter in the first plurality of letters;
   (E) acting upon the one or more head movements, the acting comprising:
      (i) pulling the identified letter to a word construction zone on the screen when the identified letter matches the correct letter of the first scrambled word, or
      (ii) forgoing pulling the identified letter to a word construction zone on the screen when the identified letter does not match the correct letter of the first scrambled word, thereby enabling the identified letter to be available for sensing (D); and
   (F) repeating the sensing (D) and acting (E) until the first plurality of letters has been pulled into the word construction zone.

16. The computing device of claim 15, wherein the one or more programs collectively include instructions for: executing the displaying (C), sensing (D), acting (E), and repeating (F) for each respective word in the plurality of scrambled words.

17. The computing device of claim 15, wherein the acting upon the one or more head movements comprises comparing a characteristic of a head movement sensed by the one or more head movement measuring components to a characteristic of a stored library of head movement commands, wherein the characteristic is one or more of (i) a speed associated with the sensed head movement, (ii) an acceleration associated with the sensed head movement, (iii) a degree of the sensed head movement, and (iv) a direction of the sensed head movement.

18. The computing device of claim 15, wherein the scrambled text phrase is formatted for sequential scrambled display of each word in the plurality of scrambled words.

19. The computing device of claim 15, wherein the one or more programs collectively further comprise instructions for:
   tracking an amount of time it takes for the user to descramble the plurality of scrambled words; and
   communicating an accolade or reward to the user when the words are descrambled within a predetermined amount of time.

20. The computing device of claim 19, wherein an identity of the accolade or reward is determined by an amount of time that it takes for the user to descramble the plurality of scrambled words.

21. The computing device of claim 15, wherein the one or more programs collectively further comprise instructions for:
tracking a number of errors incurred by the user when descrambling the plurality of scrambled words; and
communicating an accolade or reward to the user when the words are descrambled with less than a predetermined number of errors.

22. The computing device of claim 21, wherein an identity of the accolade or reward is determined by a number of errors incurred by the user in descrambling the plurality of scrambled words.

23. The computing device of claim 22, wherein an error in the number of errors is the selection of an incorrect alphanumerical character.

24. The computing device of claim 15, wherein the plurality of scrambled words collectively encodes a single phrase for the associated image.

25. The computing device of claim 15, wherein the plurality of scrambled words collectively encodes a plurality of words or phrases for the associated image.

26. The computing device of claim 15, wherein the letter is identified in the acting by dragging a predefined element onto the letter.

27. The computing device of claim 15, wherein the one or more programs collectively further comprise instructions for, subsequent to the first plurality of letters having been pulled into the word construction zone, displaying a second scrambled word, distinct from the first scrambled word, in the plurality of scrambled words on the screen as a second plurality of letters superimposed on all or a portion of the associated image.

28. The computing device of claim 15, wherein the fused image is selected in accordance with a profile associated with the user.

29. The computing device of claim 15, wherein the level of complexity associated with the user is increased when the user has successfully determined a predefined number of text phrases in a predefined time interval.

* * * * *